(12) United States Patent
Lewis et al.

(10) Patent No.: US 8,138,128 B2
(45) Date of Patent: *Mar. 20, 2012

(54) RADIATION-INDUCED THICKENING FOR SET-ON-COMMAND SEALANT COMPOSITIONS

(75) Inventors: Samuel J. Lewis, Duncan, OK (US); David F. Myers, Cary, NC (US); James L. Davis, Holly Springs, NC (US); Vikram Rao, Chapel Hill, NC (US); Vijay Gupta, Morrisville, NC (US); Lynn Soby, Apex, NC (US); Andrew K. Dummer, Chapel Hill, NC (US)

(73) Assignee: Halliburton Energy Services Inc., Duncan, OK (US)

( * ) Notice: Subject to any disclaimer, the term of this patent is extended or adjusted under 35 U.S.C. 154(b) by 14 days.

This patent is subject to a terminal disclaimer.

(21) Appl. No.: 12/547,442

(22) Filed: Aug. 25, 2009

(65) Prior Publication Data

US 2011/0054067 A1    Mar. 3, 2011

(51) Int. Cl.
    C09K 8/60     (2006.01)
    C09K 8/74     (2006.01)
    C09K 8/68     (2006.01)
    E21B 33/13    (2006.01)

(52) U.S. Cl. ........ 507/219; 507/269; 507/273; 166/293; 166/294; 166/295

(58) Field of Classification Search .................. 507/219, 507/269, 273; 166/293, 294, 295
    See application file for complete search history.

(56) References Cited

U.S. PATENT DOCUMENTS

| | | | | |
|---|---|---|---|---|
| 2,961,400 A | * | 11/1960 | Park | 166/275 |
| 3,306,870 A | * | 2/1967 | Eilers et al. | 524/413 |
| 3,493,529 A | * | 2/1970 | Krottinger et al. | 524/5 |
| 3,937,633 A | | 2/1976 | Knight et al. | |
| 4,015,991 A | | 4/1977 | Persinski et al. | |
| 4,500,357 A | * | 2/1985 | Brothers et al. | 524/5 |
| 4,515,635 A | | 5/1985 | Rao et al. | |
| 4,547,298 A | | 10/1985 | Novak | |
| 4,555,269 A | | 11/1985 | Rao et al. | |
| 4,676,317 A | | 6/1987 | Fry et al. | |

(Continued)

FOREIGN PATENT DOCUMENTS

JP    2008111677 A    5/2008

(Continued)

OTHER PUBLICATIONS

Henglein, A., "Cross-linking of polymers in solution under the influence of gamma-radiation," Journal of Physical Chemistry, vol. 63, Iss. 11, pp. 1852-1858, (1959)

(Continued)

*Primary Examiner* — Timothy J. Kugel
*Assistant Examiner* — Aiqun Li
(74) *Attorney, Agent, or Firm* — Craig W. Roddy; Misley, P.C.

(57) ABSTRACT

The present invention includes compositions relating to the setting of fluids or slurries in a wellbore. In one embodiment, a sealant composition having a fluid component and a polymeric additive component can be subjected to ionizing radiation. The ionizing radiation can cause bonding between polymeric additive components and create a polymer matrix within the sealant composition that increases the mechanical strength of the sealant composition.

22 Claims, 4 Drawing Sheets

U.S. PATENT DOCUMENTS

| | | |
|---|---|---|
| 4,676,832 A | 6/1987 | Childs et al. |
| 4,703,801 A | 11/1987 | Fry et al. |
| 4,760,882 A | 8/1988 | Novak |
| 4,768,593 A | 9/1988 | Novak |
| 5,339,903 A | 8/1994 | Eoff et al. |
| 5,393,343 A * | 2/1995 | Darwin et al. ............ 106/808 |
| 5,466,679 A | 11/1995 | Soloway et al. |
| 6,139,623 A | 10/2000 | Darwin et al. |
| 6,268,406 B1 | 7/2001 | Chatterji et al. |
| 6,641,661 B1 * | 11/2003 | Jardine et al. ............ 106/802 |
| 6,855,752 B2 * | 2/2005 | Velten et al. ............ 524/5 |
| 6,959,767 B2 * | 11/2005 | Horton et al. ............ 166/403 |
| 7,303,014 B2 | 12/2007 | Reddy et al. |
| 2009/0090514 A1 | 4/2009 | Bailey et al. |
| 2011/0079389 A1 | 4/2011 | MacKay et al. |

FOREIGN PATENT DOCUMENTS

| | | |
|---|---|---|
| WO | WO2011/029711 | 3/2011 |

OTHER PUBLICATIONS

L Maggi, et al., "Polymers-gamma ray interactions: Effects of gamma radiation on modified release drug delivery systems for oral administration" International Journal of Pharmaceutics, vol. 269 (2004) pp. 343-351.

"Material Considerations: Irradiation Processing," Sterigenics, www.sterigenics.com.

* cited by examiner

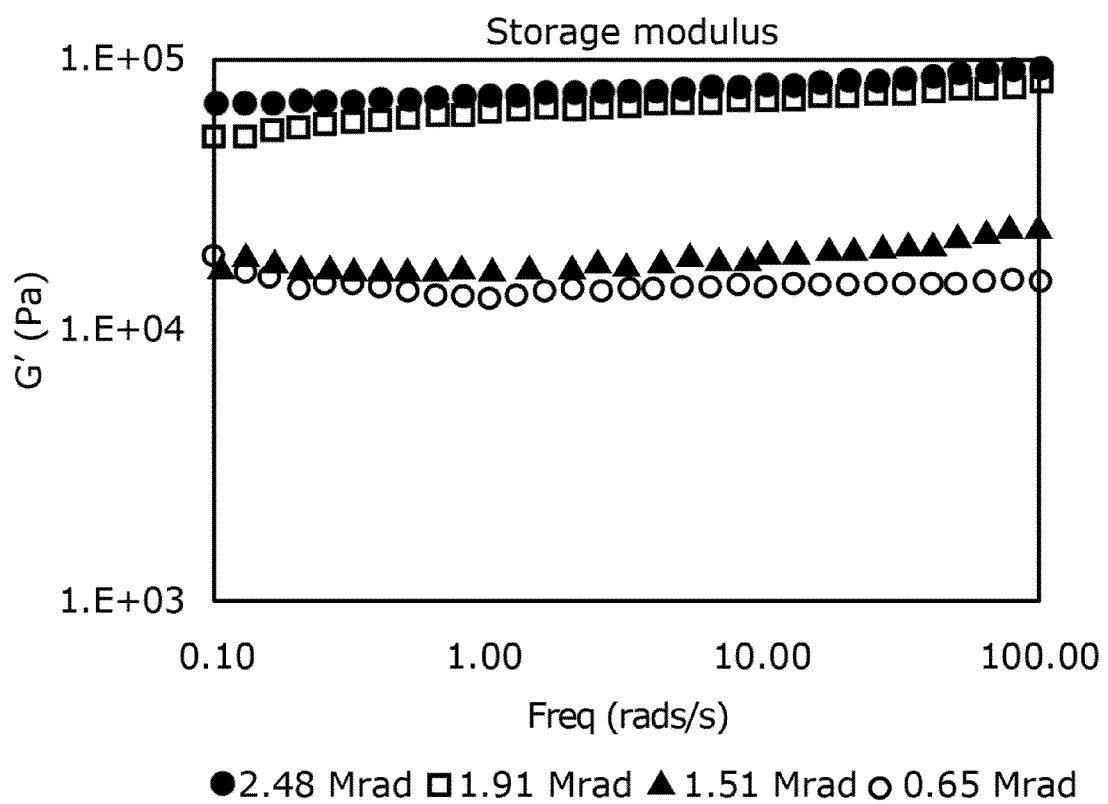

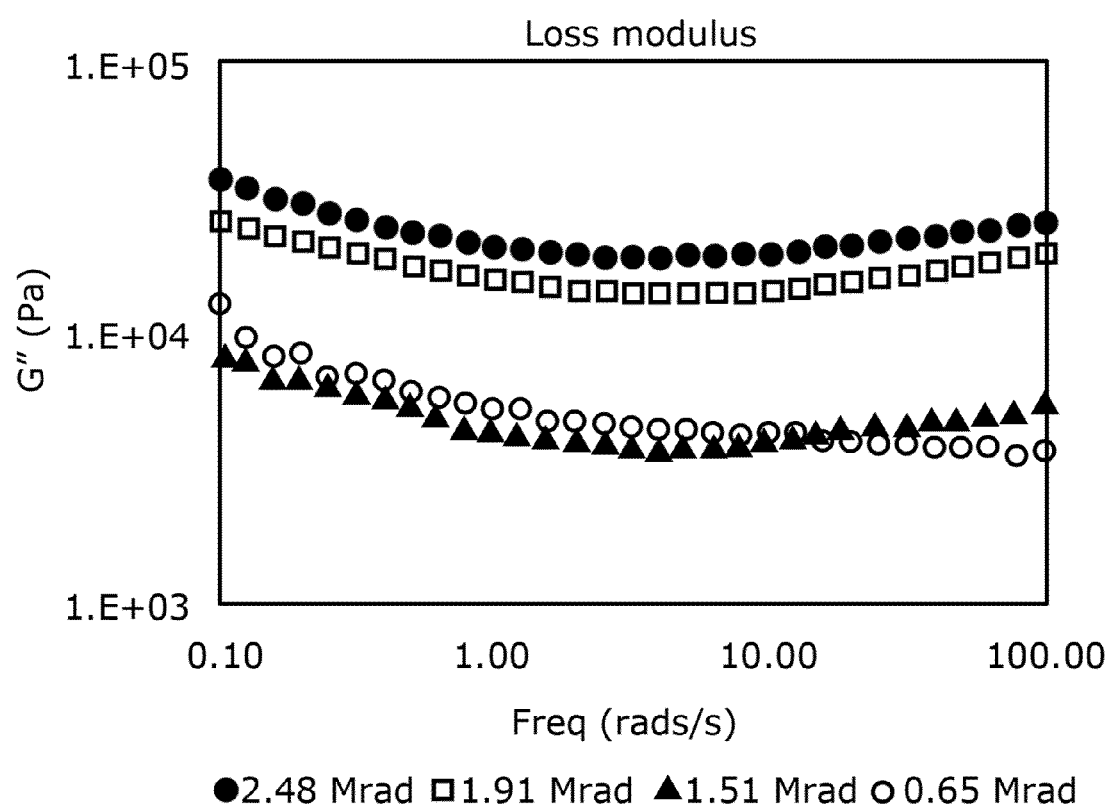

RADIATION-INDUCED THICKENING FOR SET-ON-COMMAND SEALANT COMPOSITIONS

FIELD OF THE INVENTION

The present invention generally relates to hydrocarbon exploration and production operations, and more particularly to compositions and methods that allow for greater control over the thickening of fluids or slurries, such as cement during and after subterranean cementing operations.

BACKGROUND OF THE INVENTION

Natural resources such as oil and gas located in a subterranean formation can be recovered by drilling a wellbore down to the subterranean formation, typically while circulating a drilling fluid in the wellbore. After the wellbore is drilled, a string of pipe, e.g., casing, is run in the wellbore. The drilling fluid is then usually circulated downwardly through the interior of the pipe and upwardly through the annulus between the exterior of the pipe and the walls of the wellbore, although other methodologies are known in the art.

Fluids and slurries such as hydraulic cement compositions are commonly employed in the drilling, completion and repair of oil and gas wells. For example, hydraulic cement compositions are utilized in primary cementing operations whereby strings of pipe such as casing or liners are cemented into wellbores. In performing primary cementing, a hydraulic cement composition is pumped into the annular space between the walls of a wellbore and the exterior surfaces of a pipe string disposed therein. The cement composition is allowed to set in the annular space, thus forming an annular sheath of hardened substantially impermeable cement. This cement sheath physically supports and positions the pipe string relative to the walls of the wellbore and bonds the exterior surfaces of the pipe string to the walls of the wellbore. The cement sheath prevents the unwanted migration of fluids between zones or formations penetrated by the wellbore. Hydraulic cement compositions are also commonly used to plug lost circulation and other undesirable fluid inflow and outflow zones in wells, to plug cracks and holes in pipe strings cemented therein and to accomplish other required remedial well operations. After the cement is placed within the wellbore a period of time is needed for the cement to cure and obtain enough mechanical strength for drilling operations to resume. This down time is often referred to as "waiting-on-cement", or WOC. If operations are resumed prior to the cement obtaining sufficient mechanical strength, the structural integrity of the cement can be compromised.

Two common pumping methods have been used to place the cement composition in the annulus. The cement composition may be pumped down the inner diameter of the casing and up through the annulus to its desired location. This is referred to as a conventional-circulation direction method. Alternately, the cement composition may be pumped directly down the annulus so as to displace well fluids present in the annulus by pushing them up into the inner diameter of the casing. This is referred to as a reverse-circulation direction method. Cement can also be used within the wellbore in other ways, such as by placing cement within the wellbore at a desired location and lowering a casing string into the cement. The latter method may be used, for example, when there is not the ability to circulate well fluids due to fluid loss into a formation penetrated by the wellbore.

In carrying out primary cementing as well as remedial cementing operations in wellbores, the cement compositions are often subjected to high temperatures, particularly when the cementing is carried out in deep subterranean zones. These high temperatures can shorten the thickening times of the cement compositions, meaning the setting of the cement takes place before the cement is adequately pumped into the annular space. Therefore, the use of set retarding additives in the cement compositions has been required. These additives extend the setting times of the compositions so that adequate pumping time is provided in which to place the cement into the desired location.

While a variety of cement set retarding additives have been developed and utilized, known additives, such as sugars or sugar acids, can produce unpredictable results. Hydroxy carboxylic acids, such as tartaric acid, gluconic acid and glucoheptonic acid are commonly used in oil well cementing as cement retarders. However, if an excess of hydroxy carboxylic acid, or any other retarder, is used it can over-retard the set of the cement slurry and thereby causing it to remain fluid for an extended period of time. This over-retardation can result in extended waiting time prior to resuming drilling and may allow gas to invade the slurry thereby causing unwanted gas migration. The extended waiting time results in delays in subsequent drilling or completion activities.

In a number of cementing applications, aqueous salt has been utilized as an additive in cement compositions. The salt, generally sodium chloride, functions as a dispersant in cement slurry, causing the slurry to expand upon setting whereby the attainment of a good bond between the wellbore and casing upon setting of the slurry is enhanced. However, salt saturated slurries can cause problems to bordering formations, and in certain situations salt can be leached out of the cement slurry, which could cause cement failure. Also, certain salts, such as calcium salts, can act as accelerating agents, which reduce the setting time of the cement composition. However, the presence of a set and strength accelerating agent, such as calcium salt, in the cement composition increases the risk that the cement composition may thicken or set before placement. Given the complexity of the cement chemistry and the large temperature and pressure gradients that can be present in the well bore and the difficulty in predicting the exact downhole temperatures during the placement and setting of a cement it can be difficult to control the retarding additive and accelerating to get the desired setting behavior. Systems generally are over-engineered to have very long setting (or thickening) times in order to ensure that the mix remains fluid until all of the cementitious material is in place.

Therefore, there is a need for improved set control methods, which bring about predictable fluid and slurry thickening times in subterranean environments encountered in wells. In particular, it is desirable to develop methods for rapidly thickening of such fluids, such as cement-based systems, whereby the timing of the fluid thickening is under the control of engineers in the field.

SUMMARY OF THE INVENTION

The present invention generally relates to wellbore fluid and/or slurry compositions that allow for greater control over the setting of such compositions in a wellbore.

Disclosed herein is a sealant composition comprising a wellbore treatment fluid and a polymeric additive component that can be placed into a wellbore and subjected to ionizing radiation. The polymeric additive can be a polymer that crosslinks when exposed to the ionizing radiation. The ionizing radiation can cause bonding between polymeric additive components and create a polymer matrix within the sealant composition that increases the mechanical strength of the sealant composition. The ionizing radiation can cause the destruction of at least a portion of the polymeric additive molecules, resulting in an increase in the mechanical strength of the sealant composition.

The polymeric additive can be a homopolymer, copolymer, terpolymer, hyperbranched or dendritic polymer. In embodiments the polymeric additive can be selected from polyalkyleneoxide, poly(vinyl pyrrolidone), poly(vinyl alcohol), polyacrylamide, polyacrylate, poly(vinyl methyl ether), and combinations thereof.

The sealant composition can contain chemical retarders used to inhibit sealant composition setting and the ionizing radiation can cause the destruction of at least a portion of the chemical retarders, thereby reducing fluidity in the sealant composition and increasing the mechanical strength of the sealant composition. The sealant composition can include one or more components selected from the group consisting of sealants, resins, cements, settable drilling muds, conformance fluids, and combinations thereof. The polymeric additive can be a water-soluble crosslinkable polymer, or a comb polymer. The sealant composition can further include at least one scintillator material capable of emitting secondary ionizing radiation upon exposure to the ionizing radiation.

Embodiments of the present invention also generally relate to wellbore cementing compositions and methods, which allow for greater control over the setting of cement in a wellbore.

An embodiment of the invention is a cement composition having a polymeric additive that can be placed into the wellbore and subjected to the ionizing radiation. The ionizing radiation can induce polymerization of at least a portion of the polymeric additive and can create crosslinks between the polymer chains, thus creating a polymer matrix anchored to two or more particles to increase the mechanical strength of the composite, sufficient to enable resumption of drilling. The ionizing radiation can include neutron radiation, which can be referred to as ionization inducing or indirectly ionizing. The polymeric additive can be a monomer, prepolymer, or polymer. In an embodiment at least a portion of the polymeric additive contains at least one functional group that can bond to the surface of the cement particles and at least a portion of the polymeric additive contains at least one functional group that is water-soluble and can form crosslinks when exposed to the ionizing radiation.

The ionizing radiation can cause the destruction of at least a portion of the polymeric additive molecules, resulting in an increase in the mechanical strength of the slurry.

The slurry can also contain chemical retarders used to inhibit slurry setting and the ionizing radiation can cause the destruction of at least a portion of the chemical retarders, thereby reducing fluidity in the cement phase and enhancing the increase in mechanical strength of the slurry.

The slurry can further include bridging agents capable of reacting with the polymeric additive. The bridging agents can be selected from the group comprising ethylene glycol, propylene glycol, diethylene glycol, poly vinyl pyrrolidone, poly vinyl alcohol, poly vinyl methyl ether, poly acryl amide, polyols (alcohols containing multiple hydroxyl functional groups), polyacrylates and combinations thereof. The slurry can further include at least one scintillator material capable of emitting secondary ionizing radiation upon exposure to the ionizing radiation.

Also disclosed herein is a cement composition comprising cement particles, water and a polymeric additive. At least a portion of the polymeric additive can have at least one functional group that can bond to the surface of the cement particles and at least a portion of the polymeric additive can have at least one functional group that is water-soluble and can form crosslinks when exposed to ionizing radiation. The polymeric additive can be a comb polymer that can include polycarboxylic acid (PCA) backbones that are adsorbed onto the surface of the cement particles and polyalkyleneoxide (PAO) chains that extend into the aqueous phase of the cement composition. The polyalkyleneoxide chains can be capable of crosslinking when subjected to the ionizing radiation to create a polymer matrix within the cement composition to increase the mechanical strength of the composite prior to normal hydration setting of the cement. The PAO chains can be polyethyleneoxide chains. The cement composition can further include at least one scintillator material capable of emitting secondary ionizing radiation upon exposure to the ionizing radiation.

Additionally disclosed herein is a cement composition containing a comb polymer that has cement anchoring groups and pendant ionizable dispersing groups. The cement composition can be placed into the wellbore and subjected to ionizing radiation, wherein the ionizing radiation creates crosslinks between the polymer chains. The cement anchoring groups can be polycarboxylic acid backbones of the comb polymer that are absorbed onto the surface of the cement particles. The ionizable dispersing groups can be polyalkyleneoxide chains that extend into the aqueous phase of the cement composition that can ionize and bond with adjacent ionized polyalkyleneoxide chains to form a polymer matrix within the cement composition to increase the mechanical strength of the composite prior to normal hydration setting of the cement. The cement composition can further include at least one scintillator material capable of emitting secondary ionizing radiation upon exposure to the ionizing radiation.

Further disclosed herein is a cement composition that includes monomer, prepolymer, or polymer that can be placed into the wellbore and subjected to the ionizing radiation. The ionizing radiation initiates polymerization of the monomers or prepolymers and/or crosslinking between the polymer chains of the ionized cement composition resulting from the ionizing radiation, wherein the emitting of the ionizing radiation is subject to the control of technicians in the field. The cement composition can further include at least one scintillator material capable of emitting secondary ionizing radiation upon exposure to the ionizing radiation.

The preceding has outlined rather broadly the features and technical advantages of the present invention in order that the detailed description of the invention may be more fully understood. The features and technical advantages of the present invention will be readily apparent to those skilled in the art upon a reading of the detailed description of the embodiments of the invention, which follows.

BRIEF DESCRIPTION OF DRAWINGS

FIG. 3 is a graph of Storage Modulus values from a radiation dose study.
FIG. 4 is a graph of Loss Modulus values from a radiation dose study.

DETAILED DESCRIPTION

The present invention relates to generally to wellbore operations involving fluids or slurries, and more particularly, to fluids or slurries that contain polymer or polymer precursors that can be reacted on command to provide thickening to the fluid or slurry. The fluids or slurries referred to herein can be any suitable for wellbore operations, drilling, completion, workover or production operations such as cements, drilling muds, lost circulation fluids, fracturing fluids, conformance fluids, sealants, resins, etc.

In embodiments the fluid or slurry is a cementitious composition generally comprising water and a cement component such as hydraulic cement, which can include calcium, aluminum, silicon, oxygen, and/or sulfur, which sets and hardens by reaction with the water.

Figure 1:
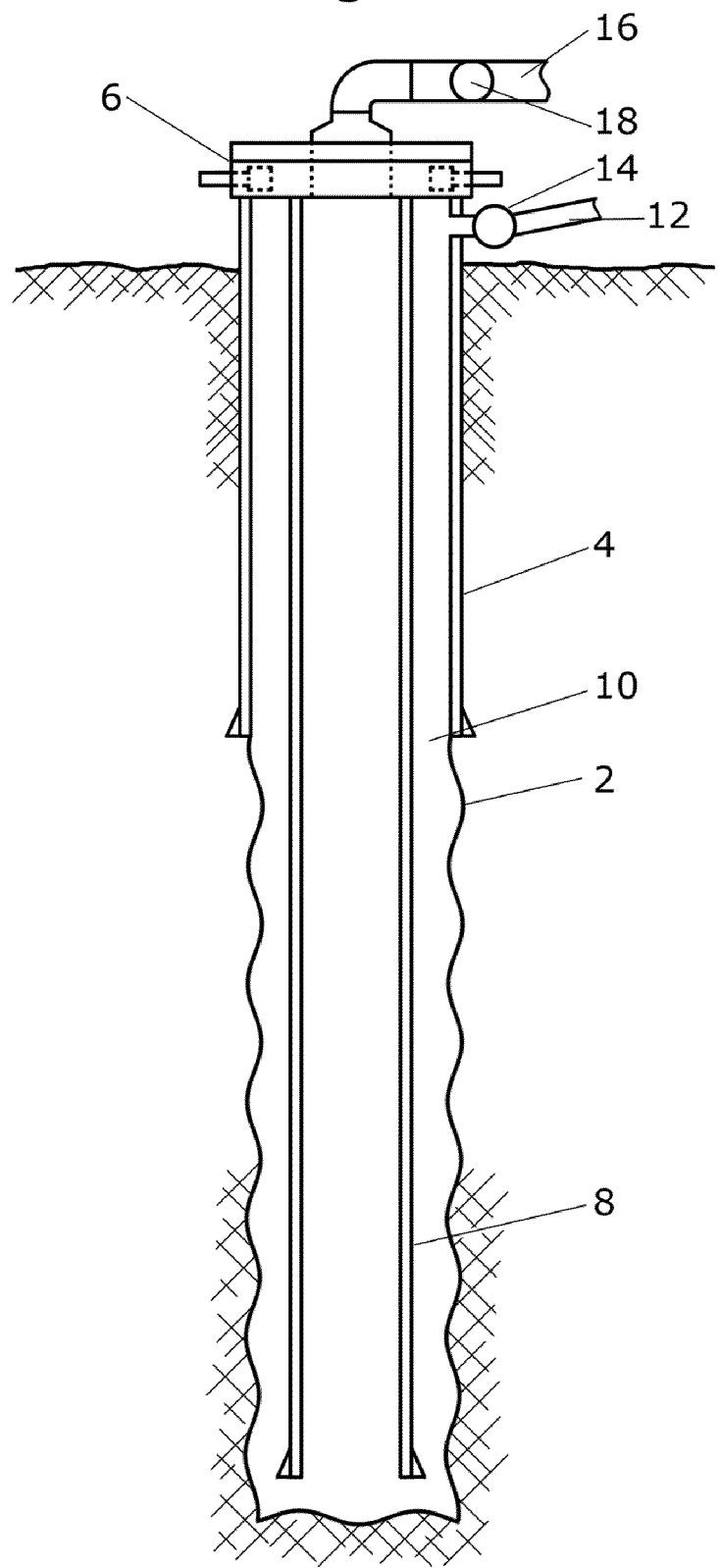
FIG. 1 illustrates a cross sectional side view of a well bore.

Referring to FIG. 1, a cross sectional side view of an embodiment of a wellbore 2 is illustrated. Surface casing 4, having a wellhead 6 attached, is installed in the wellbore 2. Casing 8 is suspended from the wellhead 6 to the bottom of the wellbore 2. An annulus 10 is defined between casing 8 and the wellbore 2. Annulus flow line 12 fluidly communicates with annulus 10 through the wellhead 6 and/or surfacing casing 4 with an annulus valve 14. Flow line 16 is connected to the wellhead 6 to allow fluid communication with the inner diameter of casing 8 and a casing valve 18. At the lower most end of casing 8 the casing is open to the wellbore 2 or has circulation ports in the walls of casing 8 (not shown) to allow fluid communication between the annulus 10 and the inner diameter of casing 8.

A cement composition can be pumped down the casing 8 and circulated up the annulus 10 while fluid returns are taken from the annulus 10 out flow line 12, in a typical circulation direction. Alternately the cement composition can be pumped into the annulus 10 from annulus flow line 12 while fluid returns are taken from the inner diameter of casing 8 through flow line 16. Thus, fluid flows through wellbore 2 in a reverse circulation direction.

In an alternate method a fluid composition, such as a cement slurry, can be placed within the wellbore 2 and a sealed or filled tubular, such as casing 8, can be lowered into the wellbore 2 such that the fluid composition is displaced into the annulus 10 area, thereby placing the fluid composition within the annulus 10 without pumping the fluid composition into the annulus 10. The above method can be referred to as puddle cementing. The fluid composition can be a drilling fluid placed within the wellbore after drilling operations are complete.

Any cement suitable for use in subterranean applications may be suitable for use in the present invention. In certain embodiments, the cement compositions used in the present invention comprise hydraulic cement. Examples of hydraulic cements include but are not limited to Portland cements (e.g., Classes A, C, G, and H Portland cements), pozzolana cements, gypsum cements, phosphate cements, high alumina content cements, silica cements, high alkalinity cements, and combinations thereof. Cements comprising shale, cement kiln dust or blast furnace slag also may be suitable for use in the present invention. In certain embodiments, the shale may comprise vitrified shale; in certain other embodiments, the shale may comprise raw shale (e.g., unfired shale), or a mixture of raw shale and vitrified shale.

The cementitious compositions used in the present invention generally comprise a base fluid. A wide variety of base fluids may be suitable for use with the present invention, including, inter alia, an aqueous-based base fluid, a nonaqueous-based base fluid, and mixtures thereof. Where the base fluid is aqueous-based, it may comprise water that may be from any source, provided that the water does not contain an excess of compounds (e.g., dissolved organics, such as tannins) that may adversely affect other compounds in the cement compositions. For example, a cement composition useful with the present invention can comprise fresh water, salt water (e.g., water containing one or more salts dissolved therein), brine (e.g., saturated salt water), or seawater. Where the base fluid is nonaqueous-based, the base fluid may comprise any number of organic liquids. Examples of suitable organic liquids include, but are not limited to, mineral oils, synthetic oils, esters, and the like. In certain embodiments of the present invention wherein primary cementing is performed, an aqueous-based base-fluid may be used. The base fluid may be present in an amount sufficient to form a pumpable slurry. More particularly, in certain embodiments wherein the base fluid is water, the base fluid may be present in the cement compositions used in the present invention in an amount in the range of from about 25% to about 150% by weight of cement ("bwoc"). In certain embodiments wherein the base fluid is water, the base fluid may be present in the cement compositions in the range of from about 30% to about 75% bwoc. In still other embodiments wherein the base fluid is water, the base fluid may be present in the cement compositions in the range of from about 40% to about 60% bwoc. In still other embodiments wherein the base fluid is water, the base fluid may be present in the cement compositions in the range of from about 35% to about 50% bwoc. The cement composition may include a sufficient amount of water to form a pumpable cementitious slurry. The water may be fresh water or salt water, e.g., an unsaturated aqueous salt solution or a saturated aqueous salt solution such as brine or seawater.

The cementitious compositions used in the present invention can further comprise a set retarder. A broad variety of set retarders may be suitable for use in the cement compositions used in the present invention. For example, the set retarder may comprise, inter alia, phosphonic acid, phosphonic acid derivatives, lignosulfonates, salts, sugars, carbohydrate compounds, organic acids, carboxymethylated hydroxyethylated celluloses, synthetic co- or ter-polymers comprising sulfonate and carboxylic acid groups, and/or borate compounds. In certain embodiments, the set retarders used in the present invention are phosphonic acid derivatives, such as those described in U.S. Pat. No. 4,676,832, the entire disclosure of which is hereby incorporated herein. Examples of suitable borate compounds include, but are not limited to, sodium tetraborate and potassium pentaborate. Examples of suitable organic acids include, inter alia, gluconic acid and tartaric acid. Generally, the set retarder is present in the cement compositions used in the present invention in an amount sufficient to delay the setting of the cement composition in a subterranean formation for a desired time. More particularly, the set retarder may be present in the cement compositions used in the present invention in an amount in the range of from about 0.1% to about 10% bwoc. In certain embodiments, the set retarder is present in the cement compositions used in the present invention in an amount in the range of from about 0.5% to about 4% bwoc. In an embodiment of the present invention the imposition of the ionizing radiation results in the alteration or destruction of a set retarder additive. As the set retarder is altered by the exposure to the ionizing radiation the effect of the set retarder on the slurry is reduced and the slurry can set sooner than it would in the absence of the ionizing radiation.

The set retarders of the current invention may include a sensitizer-containing retarder, such as a boron-containing retarder. The sensitizer can be made from a material having a strong radiation absorption property. The sensitizer can also be a scintillator material. The sensitizer can be any material that increases the capture efficiency of the ionizing radiation within the slurry. This sensitizer-containing retarder, also referred to as a sensitized retarder, can be a boron-containing retarder, also referred to as a boronated retarder, may include a wide variety of set retarders, including the set retarders disclosed herein, wherein the selected set retarder, or combination or set retarders, additionally includes at least one boron atom. As discussed in the immediately preceding paragraph, sugars and/or carbohydrates can be used as a retarder in the setting of a cement composition. In an embodiment, the retarder is a sensitized sugar or carbohydrate. In a more specific embodiment, the sensitized retarder is boronated glucose. In an even more specific embodiment, the boronated glucose is represented by 3-O-(o-Carborany-1-ylmethyl)-D-glucose, as presented in U.S. Pat. No. 5,466,679, to Soloway et al.

Optionally, the cementitious compositions used in the present invention may comprise a fluid loss control additive. A variety of fluid loss control additives may be suitable for use with the present invention, including, inter alia, fibers, flakes, particulates, modified guars, latexes, and acrylamide methyl sulfonic acid copolymers such as those that are further described in U.S. Pat. Nos. 4,015,991; 4,515,635; 4,555,269; 4,676,317; 4,703,801; 5,339,903; and 6,268,406, the entire disclosures of which are hereby incorporated herein by reference. Generally, the fluid loss control additive is present in the cement compositions used in the present invention in an amount sufficient to provide a desired degree of fluid loss control. More particularly, the fluid loss control additive may be present in the cement compositions used in the present invention in an amount in the range of from about 0.1% to about 10% bwoc. In certain embodiments, the fluid loss control additive is present in the cement compositions used in the present invention in an amount in the range of from about 0.2% to about 3% bwoc.

Optionally, the cementitious compositions used in the present invention also may include a mechanical-property modifier. Examples of suitable mechanical-property modifiers may include, inter alia, gases that are added at the surface (e.g., nitrogen), gas-generating additives that may generate a gas in situ at a desired time (e.g., aluminum powder or azodicarbonamide), hollow microspheres, elastomers (e.g., elastic particles comprising a styrene/divinylbenzene copolymer), high aspect ratio materials (including, inter alia, fibers), resilient graphitic materials, vapor/fluid-filled beads, matrix-sorbable materials having time-dependent sorption (initiated by, e.g., degradation), mixtures thereof (e.g., mixtures of microspheres and gases), or the like. In certain embodiments of the present invention, the optional mechanical-property modifier may include a latex.

In certain optional embodiments wherein microspheres are added to the cement compositions useful with the present invention, the microspheres may be present in the cement compositions in an amount in the range of from about 5% to about 75% bwoc. In certain embodiments of the present invention, the inclusion of microspheres in the cement compositions useful with the present invention may reduce the density of the cement composition.

In certain optional embodiments wherein one or more gas-generating additives are used as mechanical property modifiers in the cementitious compositions used in the present invention, the one or more gas-generating additives may comprise, inter alia, aluminum powder that may generate hydrogen gas in situ, or they may comprise azodicarbonamide that may generate nitrogen gas in situ. Other gases and/or gas-generating additives also may be suitable for inclusion in the cementitious compositions used in the present invention. Where included, a gas-generating additive may be present in the cement compositions used in the present invention in an amount in the range of from about 0.1% to about 5% bwoc. In certain embodiments where the gas-generating additive is aluminum powder, the aluminum powder may be present in the cement compositions used in the present invention in an amount in the range of from about 0.1% to about 1% bwoc. In certain embodiments where the gas-generating additive is an azodicarbonamide, the azodicarbonamide may be present in the cement compositions used in the present invention in an amount in the range of from about 0.5% to about 5% bwoc.

Optionally, the cementitious compositions used in the present invention also may include additional suitable additives, including defoaming agents, dispersants, density-reducing additives, surfactants, weighting materials, viscosifiers, fly ash, silica, free water control agents, and the like. Any suitable additive may be incorporated within the cement compositions used in the present invention.

In an embodiment of the present invention, the fluid or slurry includes a monomer additive. The monomer additive may be a synthetic or natural monomer. Examples of synthetic monomers include hydrocarbons such as ethylene, propylene or styrene monomers. Other synthetic monomers that can be used include the acrylic monomers such as acrylic acid, methyl methacrylate and acrylamide. In an embodiment, the monomer additive is present in amounts of from about 0.01% to about 10.0% bwoc, optionally from about 0.05% to about 7.5% bwoc, optionally from about 0.25% to about 2.5% bwoc.

In an embodiment, the fluid or slurry includes a crosslinkable prepolymer additive. The prepolymer additive can be a polymer intermediate, or a reactive low-molecular-weight macromolecule, or an oligomer, capable of being hardened by further polymerization. An example of a prepolymer is polyurethane prepolymer that is commercially available and well known in the art. Prepolymers can include crosslinkable functional groups that are attached to an element or compound, such as a crosslinkable prepolymer functional group attached to a polymeric material. In an embodiment, the prepolymer additive is present in amounts of from about 0.01% to about 10.0% bwoc, optionally from about 0.05% to about 7.5% bwoc, optionally from about 0.25% to about 2.5% bwoc.

In an embodiment, the fluid or slurry includes a polymer additive. Examples of the polymer additive include a monomer, prepolymer, or polymer. The polymeric additive can be a homopolymer, copolymer, terpolymer, hyperbranched or dendritic polymer. In embodiments the polymeric additive can be selected from polyalkyleneoxide, poly(vinyl pyrrolidone), poly(vinyl alcohol), polyacrylamide, polyacrylate, poly(vinyl methyl ether), and combinations thereof.

The polymeric additive can contain at least one functional group that can bond to the surface of the cement particles and at least one functional group that is water-soluble and can form crosslinks when exposed to the ionizing radiation. The polymeric additive can be a comb polymer. In an embodiment, the polymer additive is present in amounts of from about 0.01% to about 10.0% bwoc, optionally from about 0.05% to about 7.5% bwoc, optionally from about 0.25% to about 2.5% bwoc.

In an embodiment the polymeric additive is a polycarboxylate polymer superplasticizer (PCS). Superplasticizers can be useful in reducing the amount of water required to fluidify a cement mixture, and/or to impart thixotropic properties. The PCS can include one or more polymers or copolymers, and solutions thereof. In an embodiment, the PCS is a comb type polymer. The comb polymer can have a polycarboxylic acid backbone and teeth of polyalkyleneoxide (PAO) chains that have either been grafted onto the polycarboxylic acid backbone or bonded to a polymerizable carboxylic acid which is subsequently polymerized. When added to a slurry the polycarboxylic acid backbones can be absorbed onto a particle surface. For example with a cement slurry, the polycarboxylic acid backbones can be absorbed onto a cement particle surface, whereas the hydrophilic PAO chains extend into the aqueous phase. As the polycarboxylic acid backbones are absorbed onto the cement surface they are anchored to the cement surface and can resist forces to disassociate. The PAO chains extend from the polycarboxylic acid backbone into the aqueous phase. The PAO chains can then be ionized, such as through the imposition of the ionizing radiation, and can react with ionized PAO chains extending into the aqueous phase from an adjacent PCS polymer attached to an adjacent cement particle. The ionized PAO chains can bond with other ionized PAO chains forming a polymer lattice structure throughout the cement slurry. The polymer lattice structure can impart rigidity to the cement slurry prior to the setting of the cement slurry through the normal hydration setting process.

In an embodiment the polymeric additive is a polycarboxylate comb polymer superplasticizer having a backbone polymeric chain which serves as an anchoring group and having pendant non-ionized dispersing groups. The quantity of ionized particle anchoring groups and non-ionized dispersing groups and their relative ratio is not limited within the present invention. In an embodiment the ratio of the ionized particle anchoring groups ranges from about 1:100 to about 100:1 with respect to the non-ionized dispersing groups. Alternately the ratio of the ionized particle anchoring groups is about 1:50 to about 50:1, optionally about 1:1 to about 25:1 with respect to the non-ionized dispersing groups. The ionized particle anchoring group can be absorbed onto a particle surface, whereas the non-ionized dispersing groups extend into the aqueous phase. The non-ionized dispersing groups can then be ionized, such as through the imposition of the ionizing radiation, and can react with each other forming a polymer lattice structure throughout the slurry that thickens the slurry. Further, polycarboxylate polymer molecules are available with multiple lengths of pendant polyalkylene oxide groups, wherein the selection of the correct ratio can control both workability retention and rate of crosslinking upon exposure to the ionizing radiation. Polycarboxylate polymer superplasticizers (PCS) that are suitable for use in the current invention are commercially available from companies such as BASF and W. R. Grace, Sika, Nippon Shokubai, Kao Soap, Nippon Oil and Fats, and others.

In an embodiment the polymeric additive is a polymer selected from a group comprising of polyalkyleneoxide (PAO), poly vinyl pyrrolidone (PVP), poly vinyl alcohol (PVA), poly vinyl methyl ether (PVME), poly acrylamide (PAAm). The polymeric chains can be dispersed within the aqueous phase of the fluid or slurry and can be ionized, such as through the imposition of the ionizing radiation, to react with adjacent ionized polymeric chains. The linking of adjacent ionized polymeric chains forms a polymer lattice structure throughout the fluid that imparts thickening to the aqueous phase. The polymer lattice structure can impart thickening to cement slurry prior to the setting of the cement slurry through the normal hydration setting process. In alternate embodiments the polymer lattice structure can impart thickening to other fluids such as a conformance fluid used to seal a water-bearing zone or to a settable drilling fluid. The polymeric additive can be a water-soluble polymer that can be cross-linked upon exposure to the ionizing radiation. The polymeric additive can also be a comb polymer with at least two functional groups, one that can be anchored, such as to a cement grain, and another that can be cross-linked upon exposure to the ionizing radiation.

In an embodiment of the present invention the imposition of the ionizing radiation results in the alteration or destruction of the polymeric additive. As the polymeric additive is altered by the exposure to the ionizing radiation the resulting altered polymeric additive can result in a thickening of the slurry. In embodiments the slurry can thicken sooner than it would in the absence of the ionizing radiation.

The fluid or slurry compositions used in the present invention can further include a scintillator material. The scintillator material can act to increase capture efficiency of the ionizing radiation and/or can emit ionizing radiation, or non-ionizing radiation, upon exposure to the ionizing radiation. A scintillator material having the property of fluorescence can emit radiation, which can be referred to as secondary radiation, as the result of absorption of radiation from another source. For example a scintillator material may emit gamma rays, X-rays, or UV radiation upon exposure to neutrons or gamma rays. This secondary radiation can be used to provide radiation to promote the degradation of the polymer and/or the release of the accelerator into the fluid or slurry. If the secondary radiation includes photons or particles with the same wavelength as that of the absorbed radiation, it can be referred to as resonance radiation.

A variety of neutron scintillators are known, a non-limiting list includes LiF/ZnS:Ag, Li-glass, and LiI:Eu. LiF/ZnS:Ag is shown to produce a very large neutron multiplication factor and has been measured at 160,000 photons per neutron absorbed with the majority of the emission occurring below about 450 nm. Li-glasses typically have an emission maximum below about 400 nm.

A variety of gamma ray scintillators are known, a non-limiting list includes $NaI:Tl^+$, $Bi_4Ge_3O_{12}$(GSO), $Gd_2SiO_5$:$Ce^{3+}$, ZnS:Ag. Alkali halides include CsI and NaI. Typical emission maxima observed for some scintillators are: CsI—about 300 nm; $BaF_2$—about 190 to about 305 nm; $CaF_2$:Eu—about 410 nm; GSO:Ce—about 420 nm; $YAl:CaTiO_3$:Ce—about 350 nm.

The scintillator may be used in a powder or crystal form or with a coating such as a polymer. Advantages of incorporating scintillators into the fluid or slurry of the present invention can include the local creation of secondary radiation that can minimize the impact from the well casing or other environmental influences. Potentially large multiplication factors are possible, for example some scintillators will emit more than 10,000 photons for each absorbed ionizing radiation particle/photon. The photons produced by scintillators can be in the X-ray and UV spectral regions that can be highly absorbed by the polymeric component of the slurry. Since these photons are created locally by the scintillation their emission may increase the efficiency of the polymer encapsulation degradation. More photons above the threshold for radical generation from the polymer can increase the rate of either crosslinking or polymer degradation via chain scission, or both simultaneously, depending on polymer chemistry. This process can speed the thickening of the cement slurry and enhance the set-on-command behavior.

The scintillator material may be added to the fluid or slurry. The scintillator material may be incorporated into a polymeric additive or component.

As used herein the term polymeric additive or polymer additive can include one or more of a polymer or one or more of a polymer precursor such as a monomer or prepolymer intermediate, or combinations thereof.

In an embodiment, the polymeric additive is added to a cement mixture before water is added to the mixture. In another embodiment, the polymeric additive is added to a cement mixture after water has been added to the mixture. In yet another embodiment, the polymeric additive is added to water that is to be added to a cement mixture. In yet another embodiment, the polymeric additive is added during the mixing of a cement and water. In another embodiment, different polymeric additives are added at any of the separate times as described above during the preparation of the cement mixture.

In an embodiment, once the cementitious composition containing the polymeric additive is obtained, the mixture is then placed in the wellbore, such as in a wellbore/casing annulus. Upon the placement of the cement mixture containing the polymeric component in the wellbore, the cement particles would be in intimate contact with one another and the absorbed polymer chains of neighboring particles would be intermixed.

According to embodiments of the invention, after the intermixed composition is placed in the wellbore, the ionizing radiation is introduced. Ionizing radiation contains subatomic particles or electromagnetic waves that are energetic enough to detach electrons from atoms or molecules, thereby ionizing them. The occurrence of ionization depends on the energy of the intruding individual particles or electromagnetic waves, which must have energies above the ionization threshold (i.e., photoelectric effect). In an embodiment, the amount of ionizing radiation introduced into the wellbore is determined by the amount of ionizing radiation required to ionize the monomer, prepolymer or polymer chains of the polymeric additive. The ionizing radiation can be emitted from or in the form of charged particles.

In an embodiment, the charged particles include alpha particles, beta particles, or gamma particles, or combinations thereof. In an optional embodiment, the amount of the ionizing radiation required to ionize a polymeric additive component is between about 1 KiloGray to about 500 KiloGray, optionally between about 1 KiloGray to about 100 KiloGray, optionally between about 4 KiloGray to about 40 KiloGray. The amount of ionizing radiation emitted can be determined by the level of crosslinking desired and the type of polymer added to the cement mixture. The fluid or slurry can further include at least one scintillator material capable of emitting secondary radiation upon exposure to the ionizing radiation. In embodiments the scintillator material is capable of reducing the ionizing radiation required. In an embodiment the scintillator material is capable of reducing the ionizing radiation required to less than half that is required without the scintillator material.

In an embodiment, the ionizing radiation is introduced by an ionizing radiation emitter located at a point within the wellbore. In another embodiment, an ionizing radiation emitter located at the surface introduces the ionizing radiation directed downward into the wellbore. In another embodiment, a radiation source is lowered into the wellbore, such as on a wireline, and the ionizing radiation is emitted. The radiation source can be shielded to not emit radiation other than when the shielding is removed. For example, a radiation source can be shielded at the surface when personnel could otherwise be exposed. Once the radiation source is placed in the wellbore and the ionizing radiation can safely be emitted, the shield can be removed or opened, such as by an electronically activated signal transmitted from the surface down the wireline to the shield. In an embodiment the radiation emitter can emit ionizing radiation as it is lowered down the wellbore and as it is pulled up the length of the wellbore. In a further embodiment, two or more radiation emitters are separately lowered to two or more depths, such that two or more depths of the wellbore may be subject to the ionizing radiation simultaneously.

In an embodiment, the ionizing radiation is introduced under the control of a technician in the field. The technician, engineer, or other on-site employee, can have the control over the emission of ionizing radiation by imputing a signal that causes a release of ionizing radiation from an emitter. In this embodiment, the ionizing radiation is released on demand from the technician in the field. The ionizing radiation can be released by a control system having parameters such as timer, flow meter, temperature sensor, or the like. In another embodiment, the lowering and/or emitting of the ionizing radiation source is triggered by a timing mechanism. In a further embodiment, the lowering and/or emitting of the ionizing radiation source is triggered by a flow meter that detects the amount of the intermixed composition delivered into the wellbore.

Upon the introduction of ionizing radiation, a network of crosslinks between polymeric chains can be created. This can be a result of the ionizing radiation on the polymeric chain and from the effects of the ionizing radiation on other compounds present such as water and solvents. Radiation, such as alpha radiation, can also initiate the dissociation of molecules, which can be referred to as radiolysis. In one embodiment the radiolysis of water can generate hydroxide radicals, which can abstract hydrogen from the polymeric chains, and thereby form a polymer radical. The polymer radicals can combine through intermolecular and/or intramolecular crosslinking and produce a gelled state. The radiolysis of other compounds such as solvents (solvent radiolysis) can generate intermediates that also can react with the polymeric chain. Such a network of crosslinks increases the mechanical strength of the intermixed composition, for example a cement composite prior to the typical cement hydration setting.

The modification of mechanical strength of the fluid, slurry or composite depends upon the level of crosslinking. Low crosslink densities can raise the viscosity of the composition to a gum-like consistency and high crosslink densities can cause the composition to become rigid. In one embodiment, the ionizing radiation is introduced such that a low level of crosslinking is achieved, followed by another introduction of ionizing radiation such that a high level of crosslinking is ultimately achieved. The increase in the mechanical strength of a cement composite prior to the typical cement hydration setting can enable the resumption of activities at an earlier time as compared to having to wait on the cement hydration setting.

The fluid or slurry compositions used in the present invention can further include a scintillator material. The scintillator material can act to increase capture efficiency of the ionizing radiation and/or can emit ionizing radiation, or non-ionizing radiation upon exposure to the ionizing radiation.

In an embodiment, wherein the polymer is a polycarboxylate superplasticizer, the ionizing radiation can be used to crosslink neighboring polymeric chains in the aqueous medium. In this embodiment, particles are separated by the steric hindrance caused by anchored polymeric chains, which results in very few crosslinks being required to create a continuous crosslinked network resulting in increased strength. This effect can be further enhanced by adding agents in the aqueous phase that can increase the density of potential reactants in the vicinity of the particles and improve the kinetics of the radiation-enhanced setting process of the current invention without otherwise affecting the properties of the fluid, slurry or composite such as a cement composition.

The ionizing radiation of the current invention can destroy molecules in addition to causing crosslinking. For example, the destruction of polymeric chains and the chemical retarders used to inhibit setting may also serve to reduce fluidity in the cement phase and thus enhance the increase in the mechanical strength of the process. Rather than being problematic, this result of the invention can serve to improve the performance of the "set on command" aspect of the current invention.

In an embodiment, the cementitious compositions disclosed herein can also contain a water-soluble crosslinking agent to facilitate the reaction between two polymer chains. In an embodiment, the water-soluble crosslinking agent is a lower molecular weight species having good mobility in the aqueous phase and high reactivity towards the free radicals that are created by the ionizing radiation of the polymeric additive. In an embodiment, the water-soluble crosslinking agent is a water-soluble polymer. In another embodiment, the water-soluble crosslinking agent is a high molecular weight water-soluble polysaccharide. In an embodiment, the water-soluble crosslinking agent is selected from the group consisting of ethylene glycol, diethylene glycol, propylene glycol, polyalkyleneoxides such as polyethyleneoxide, polyvinyl alcohol, and polycarboxylic acids such as polyacrylic acid, citric acid, butanetetracarboxylic acid and the like.

As mentioned above, the ionizing radiation of the current invention can be under the control of technicians in the field. In an embodiment the ionizing radiation emissions can induce a preliminary increase in mechanical strength of the cement composite prior to the hydration setting of the cement. Therefore, the increase in mechanical strength of the concrete composition of the invention is under the control of technicians in the field. Such control can result in a decrease in the time needed to wait on cement (WOC) in the drilling and completion of a wellbore. In an embodiment, the WOC time of the cement composition of the invention containing a radiation reactive polymeric additive is less than the WOC time of a substantially similar cement composition not containing the polymeric additive. In embodiments the inventive cement composition reduces the WOC time by at least an hour, at least two hours, at least five hours, or at least 10 hours as compared to a substantially similar cement composition not containing the polymeric additive.

EXAMPLES

Example 1

800 grams of a Class H cement was mixed with 320 mL of water (to give a water-to-cement, w/c ratio of 0.40) and 0.5% bwoc of a 900,000 MW PEO (polyethylene oxide) to form a slurry. The slurry also contained 0.50% bwoc maltrodextrin, a cement set retarder. The slurry was mixed for 45 seconds in a Waring blade mixer at high shear. The slurry was split into two samples. One sample was exposed to 4.3 Mrads of gamma radiation exposure from a Co-60 source while the other was kept as the control. The control sample, that was not irradiated was still fluid (yield point measured at 3.5 Pa) whereas the gamma-irradiated sample had cross-linked and was totally solid.

Example 2

Several slurries were prepared using a Class H cement, water (to give a water-to-cement, w/c, ratio of 0.40) with two different PEOs (100,000 MW and 900,000 MW). Other components in the slurries were a polycarboxylate ether (dispersant), Diutan gum (viscosity modifier) and maltodextrin (retarder). The mix-designs for the slurries are given in Table 1.

TABLE 1

Mix designs for the slurries used in cross-linking experiments.

| Mix Design | | MIX #1 | MIX #2 | MIX #3 | MIX #4 | MIX #5 | MIX #6 |
|---|---|---|---|---|---|---|---|
| Cement | grams | 800 | 800 | 800 | 800 | 800 | 800 |
| water | grams | 316.4 | 316.4 | 320 | 320 | 320 | 320 |
| Retarder (Maltodextrin) | grams | 4 | 4 | 4 | 4 | 4 | 4 |
| Disperant Name | | ADVA 575 | ADVA 575 | Melflux 1641 | Melflux 1641 | Melflux 2651 | Melflux 2651 |
| Disperant Total Solids | | 0.40 | 0.40 | 1.00 | 1.00 | 1.00 | 1.00 |
| Dispersant | grams | 6 | 6 | 2.4 | 2.4 | 2.4 | 2.4 |
| VMA (Diutan Gum) | grams | 3.2 | 3.2 | 3.2 | 3.2 | 3.2 | 3.2 |
| PEO MW | | 100,000 | 900,000 | 100,000 | 900,000 | 100,000 | 900,000 |
| PEO | grams | 4 | 4 | 4 | 4 | 4 | 4 |

All of the slurries were exposed to 4.3 Mrads of gamma radiation from a Co-60 source and were found to cross-link and gel on exposure to gamma radiation while non-radiated controls were still fluid. The yield points for the controls were determined using the FANN® 35 viscometer and are shown in Table 2. No such measurements were possible on the gelled samples.

TABLE 2

Yield point measurements of the controls for the cross-linking experiments.

| Mix ID | Yield Point (Pa) |
|---|---|
| 1 | 92 |
| 2 | 94 |
| 3 | 110 |
| 4 | 96 |
| 5 | 110 |
| 6 | 122 |

Example 3

800 grams of a Class H cement was mixed with 320 mL of water (w/c=0.40) and 0.5% bwoc of a 360,000 MW poly (vinyl pyrrolidone) to form a slurry. The slurry also contained 0.50% bwoc maltrodextrin, a cement set retarder. The slurry was mixed for 45 seconds in a Waring blade mixer at high shear. The slurry was split into two samples. One sample was exposed to 4.3 Mrads of gamma radiation exposure from a Co-60 source while the other was kept as the control. The control sample that was not irradiated was still fluid, with a yield point measured at 150 Pa, whereas the gamma-irradiated sample had cross-linked and was totally solid.

Example 4

800 grams of a Class H cement was mixed with 320 mL of water (w/c=0.40) and 0.5% bwoc of a 900,000 MW PEO (polyethylene oxide) to form a slurry. The slurry also contained 0.50% bwoc maltrodextrin, a cement set retarder. The slurry was mixed for 45 seconds in a Waring blade mixer at high shear. The slurries were exposed to gamma radiation dose ranging from 0.4 Mrad to 2.5 Mrad. All the slurry samples exposed to gamma radiation resulted in gelling of the samples whereas the control samples remained fluid with a yield point of 36 Pa.

Figure 2:
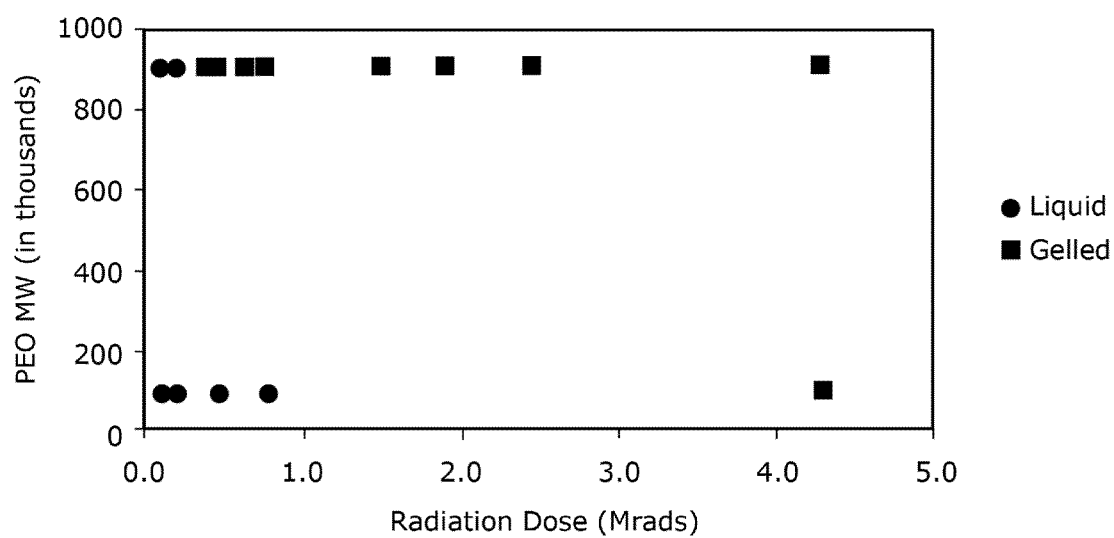
FIG. 2 is a graph of results from a radiation dose study.

FIG. 2 illustrates the results of the dose response study in PEO of differing radiation exposure. FIGS. 3 and 4 illustrate the results of the dose response study in PEO of differing radiation exposure and the resulting effect on Storage Modulus and Loss Modulus. The modulus values increased with radiation dosage.

Example 5

Aqueous solutions of PEO and Polycarboxylates were irradiated with 4.3 Mrads of gamma-radiation. The observations were as shown in Table 3.

TABLE 3

| Sample ID | Sample | Effect of Radiation |
|---|---|---|
| 1 | 2% solution of 100,000 MW PEO | Cross-links |
| 2 | 5% solution of 100,000 MW PEO | Cross-links |
| 3 | 2% solution of 900,000 MW PEO | Cross-links |
| 4 | 5% solution of 900,000 MW PEO | Cross-links |
| 5 | 10% solution of ADVA 575 | No crosslinking |
| 6 | 10% solution of Melflux 1641 | No crosslinking |
| 7 | 10% solution of Melflux 2651 | No crosslinking |

The fluid or slurry compositions used in the present invention can further include a sensitizer material. The sensitizer can be made from a material having a strong radiation absorption property. The sensitizer can also be a scintillator material. The sensitizer can be any material that increases the capture efficiency of the ionizing radiation within the slurry.

Various elements can be utilized as a sensitized material. In general, elements having a greater absorption cross-section than the wellbore treatment fluid composition can be used to increase the capture efficiency of the ionizing radiation within the composition. Many wellbore treatment fluid compositions can comprise calcium, which has an absorption cross-section for 2200 m/s neutrons of about 0.43 barn. A non-limiting listing of elements having an absorption cross-section for 2200 m/s neutrons of 10 barn or greater is shown below in Table 4. A barn is defined as being $10^{-28}$ m$^2$, and corresponds to approximately the cross sectional area of a uranium nucleus.

TABLE 4

Absorption cross section for 2200 m/s neutrons

| Element | Absorption cross section for 2200 m/s neutrons (barn) |
|---|---|
| Li | 71 |
| B | 767 |
| Cl | 34 |
| Sc | 28 |
| Mn | 13 |
| Co | 37 |
| Se | 12 |
| Kr | 25 |
| Tc | 20 |
| Rh | 145 |
| Ag | 63 |
| Cd | 2,520 |

TABLE 4-continued

Absorption cross section for 2200 m/s neutrons

| Element | Absorption cross section for 2200 m/s neutrons (barn) |
|---|---|
| In | 194 |
| Xe | 24 |
| Pr | 12 |
| Nd | 51 |
| Pm | 168 |
| Sm | 5,922 |
| Eu | 4,530 |
| Gd | 49,700 |
| Tb | 23 |
| Dy | 994 |
| Ho | 65 |
| Er | 159 |
| Tm | 100 |
| Yb | 35 |
| Lu | 74 |
| Hf | 104 |
| Ta | 21 |
| W | 18 |
| Re | 90 |
| Os | 16 |
| Ir | 425 |
| Pt | 10 |
| Au | 99 |
| Hg | 372 |

As used herein, "comb polymers" means those polymers having a main chain backbone and linear side chain pendant groups.

As used herein, "polycarboxylate comb superplasticizers" means those cement dispersing polymers and copolymers having a polycarboxylate backbone and polyalkylene oxide groups pendant therefrom, such as polyethylene oxide, polypropylene oxide, etc., and mixtures of the same. Polymers of these general types can be prepared by any suitable manner such as, for example, by copolymerizing unsaturated (alkoxy)polyalkylene glycol mono(meth)acrylic acid or ester type monomers with (meth) acrylic acid type monomers such as are described in U.S. Pat. No. 6,139,623, the disclosure of which is hereby incorporated by reference.

The term "cementitious composition" as may be used herein includes pastes (or slurries), mortars, and grouts, such as oil well cementing grouts, shotcrete, and concrete compositions comprising a hydraulic cement binder. The terms "paste", "mortar" and "concrete" are terms of art: pastes are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand), and "concretes" are mortars additionally including coarse aggregate (e.g., crushed rock or gravel). The cement compositions described in this invention are formed by mixing required amounts of certain materials, e.g., a hydraulic cement, water, and fine and/or coarse aggregate, as may be required for making a particular cementitious composition.

The term "ionizing radiation" as may be used herein can be referred to as ionization inducing or indirectly ionizing, that are able to detach electrons from atoms or molecules, and can include alpha rays, beta rays, gamma rays, proton rays, neutron radiation, UV and X-rays.

The term "polymeric additive" as may be used herein can include one or more of a polymer or polymer precursor, such as a monomer or a prepolymer intermediate, that is susceptible to ionizing radiation.

The term "set" as used herein refers to an increase in mechanical strength of a fluid or slurry sufficient to perform a desired result, such as to restrict movement of an item or impede fluid flow or pressure transfer through a fluid. A cement may be referred to as set when it can restrict the movement of a pipe, or impede fluid flow or pressure transfer, regardless of whether the cement has cured to a fully solid composition. A fluid or slurry can be referred to as set when it has thickened to a sufficient level that it achieves the desired result, such as the isolation of a particular zone or the restriction of fluid flow or pressure transfer, regardless of whether it has reached its final consistency.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

The invention claimed is:

1. A wellbore sealant composition comprising:
   a wellbore treatment fluid;
   a scintillator material;
   cement; and
   a comb polymer having anchoring groups and ionizable dispersing groups;
   wherein the scintillator material is capable of emitting secondary radiation upon exposure to the ionizing radiation and selected from the group consisting of LiF/ZnS: Ag, LiI:Eu, NaI:Tl$^+$, Bi$_4$Ge$_3$O$_{12}$(GSO), Gd$_2$SiO$_5$:Ce$^{3+}$, ZnS:Ag, CsI, CaF$_2$:Eu, GSO:Ce, YAl:CaTiO$_3$:Ce, and combinations thereof;
   wherein the comb polymer is a polymer that crosslinks when exposed to ionizing radiation; and
   wherein the sealant composition is capable of thickening upon exposure to the ionizing radiation.

2. The composition of claim 1, wherein the comb polymer contains two or more differing chain length polyalkyleneoxide pendant groups, with a ratio of chain lengths one to the other of at least 1.3.

3. The composition of claim 1, wherein the comb polymer is present in an amount in the range of from about 0.01% to about 25% by weight of the cement.

4. A cement composition for use in a subterranean formation, comprising:
   hydraulic cement;
   water;
   a chemical retarder;
   a scintillator material; and
   a polymeric additive capable of thickening the cement composition upon exposure to ionizing radiation;
   wherein the chemical retarder is used to inhibit setting of the cement composition and wherein the chemical retarder is at least partially destroyed by the ionizing radiation;
   wherein the scintillator material is capable of emitting secondary radiation upon exposure to the ionizing radiation and selected from the group consisting of LiF/ZnS: Ag, LiI:Eu, NaI:Tl$^+$, Bi$_4$Ge$_3$O$_{12}$(GSO), Gd$_2$SiO$_5$:Ce$^{3+}$, ZnS:Ag, CsI, CaF$_2$:Eu, GSO:Ce, YAl:CaTiO$_3$:Ce, and combinations thereof; and
   wherein the polymeric additive is a polymer that crosslinks when exposed to the ionizing radiation ranging from 1 to 100 KiloGray.

5. The composition of claim 4, wherein the polymeric additive contains at least one functional group which can bond to the surface of cement particles, and a second functional group which is water soluble and can form crosslinks when exposed to the ionizing radiation.

6. The composition of claim 4, wherein the polymeric additive is a comb polymer having cement anchoring groups and pendant ionizable dispersing groups.

7. The composition of claim 6, wherein the comb polymer contains two or more differing chain length polyalkyleneoxide pendant groups, with a ratio of chain lengths one to the other of at least 1.3.

8. The composition of claim 4, wherein the polymeric additive is a polycarboxylate superplasticizer.

9. The composition of claim 8, wherein the polycarboxylate superplasticizer comprises polycarboxylic acid backbones and polyalkyleneoxide chains attached to the polycarboxylic acid backbone.

10. The composition of claim 4, wherein the polymeric additive is selected from a group consisting of polyalkyleneoxide, poly(vinyl pyrrolidone), poly(vinyl alcohol), polyacrylamide, poly(vinyl methyl ether), and combinations thereof.

11. The composition of claim 4, wherein the polymeric additive is a homopolymer, a copolymer, a terpolymer, a hyperbranched, or a dendritic polymer.

12. The composition of claim 11 wherein the polymeric additive is selected from a group consisting of polyalkyleneoxide, poly(vinyl pyrrolidone), poly(vinyl alcohol), polyacrylamide, polyacrylate, poly(vinyl methyl ether), and combinations thereof.

13. The composition of claim 4, wherein the polymeric additive is present in an amount in the range of from about 0.01% to about 25% by weight of the cement.

14. The composition of claim 4, further comprising a bridging agent capable of reacting with the polymeric additive.

15. The composition of claim 14, wherein the bridging agent is selected from the group consisting of ethylene glycol, propylene glycol, diethylene glycol, polyalkyleneoxide and polyols (alcohols containing multiple hydroxyl functional groups), and combinations thereof.

16. The composition of claim 4, further comprising a sensitizer material to increase the cement composition capture efficiency for the ionizing radiation.

17. The composition of claim 16, where the sensitizer material is a boronated retarder.

18. The composition of claim 1, wherein the anchoring groups are present relative to the dispersing groups in a ratio ranging from 1:1 to 25:1.

19. The composition of claim 1, wherein the amount of the ionizing radiation required to ionize the comb polymer ranges from 1 to 100 KiloGray.

20. The composition of claim 1, wherein the amount of the ionizing radiation required to ionize the comb polymer ranges from 4 to 40 KiloGray.

21. The composition of claim 6, wherein the anchoring groups are present relative to the dispersing groups in a ratio ranging from 1:1 to 25:1.

22. The composition of claim 4, wherein the amount of the ionizing radiation required to ionize the polymeric additives ranges from 4 to 40 KiloGray.

* * * * *